(12) United States Patent
Joshi et al.

(10) Patent No.: US 8,537,934 B2
(45) Date of Patent: Sep. 17, 2013

(54) SYSTEM AND METHOD FOR MULTI-CARRIER MODULATION

(75) Inventors: Robindra B. Joshi, Laguna Niguel, CA (US); Jeffrey S. Putnam, Tustin, CA (US); Thuji S. Lin, Irvine, CA (US); Paul T. Yang, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 794 days.

(21) Appl. No.: 11/331,520

(22) Filed: Jan. 12, 2006

(65) Prior Publication Data

US 2006/0120472 A1   Jun. 8, 2006

Related U.S. Application Data

(63) Continuation of application No. 09/826,969, filed on Apr. 4, 2001, now Pat. No. 7,010,062.

(60) Provisional application No. 60/194,544, filed on Apr. 4, 2000.

(51) Int. Cl.
*H04L 27/00* (2006.01)

(52) U.S. Cl.
USPC ........... 375/326; 375/260; 375/261; 375/362; 375/375; 375/376

(58) Field of Classification Search
USPC ................. 375/260, 261, 326, 362, 375, 376
See application file for complete search history.

(56) References Cited

U.S. PATENT DOCUMENTS

| | | | | |
|---|---|---|---|---|
| 4,468,632 A | * | 8/1984 | Crowley | 331/14 |
| 4,604,583 A | | 8/1986 | Aoyagi et al. | |
| 5,228,062 A | * | 7/1993 | Bingham | 375/344 |
| 5,315,583 A | * | 5/1994 | Murphy et al. | 370/312 |
| 5,406,592 A | | 4/1995 | Baumert | |
| 5,802,117 A | * | 9/1998 | Ghosh | 375/344 |
| 5,815,529 A | * | 9/1998 | Wang | 375/285 |
| 6,154,455 A | * | 11/2000 | Mekkoth et al. | 370/342 |
| 6,275,990 B1 | | 8/2001 | Dapper et al. | |

(Continued)

FOREIGN PATENT DOCUMENTS

EP   1 087 583 A   3/2001

OTHER PUBLICATIONS

Hirosaki, B. et al., "A 19.2 Kbps Voiceband Data Modem Based on Orthogonally Multiplexed QAM Techniques", *IEEE Int'l Conference on Communications*, pp. 661-665, Jun. 1985, Chicago, IL.

*Primary Examiner* — Ted Wang
(74) *Attorney, Agent, or Firm* — Sterne, Kessler, Goldstein & Fox P.L.L.C.

(57) ABSTRACT

A method of compensating for carrier frequency and phase errors of a received multi-carrier modulated signal. The received multi-carrier signal including modulated carriers for transmitting known data and unmodulated carriers for error correction, comprising, time domain down converting the received multi-carrier signal to base-band to provide a down-converted signal, the down-converted signal including a plurality of modulated carriers for transmitting known data and unmodulated carriers for error correction. Sampling an unmodulated carrier of the down-converted signal to provide received data samples. Providing a reference signal derived from the unmodulated carrier of the down-converted signal. And, estimating phase errors from a phase difference between the unmodulated carrier and the reference signal derived from the unmodulated carrier of the down-converted signal to provide a plurality of received sample phase error estimates for each modulated carrier.

20 Claims, 14 Drawing Sheets

(56) References Cited

U.S. PATENT DOCUMENTS 6,359,945 B1 3/2002 Doblar
6,704,374 B1 3/2004 Belotserkovsky et al.
6,721,337 B1 4/2004 Kroeger et al.

\* cited by examiner

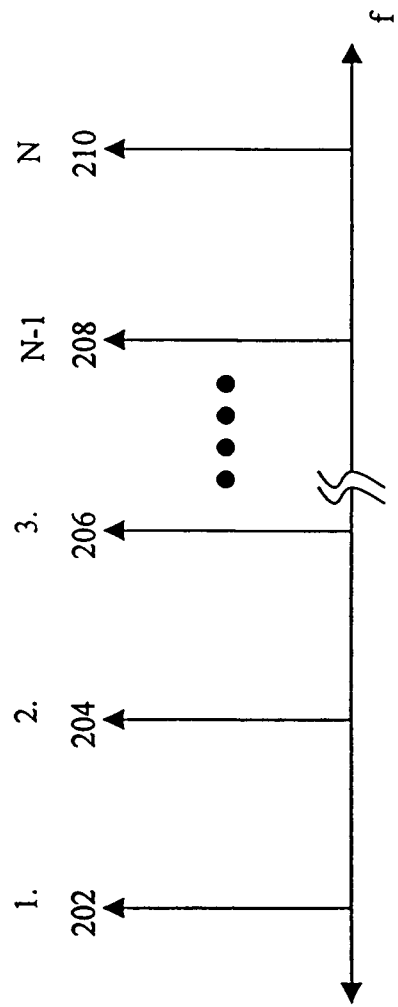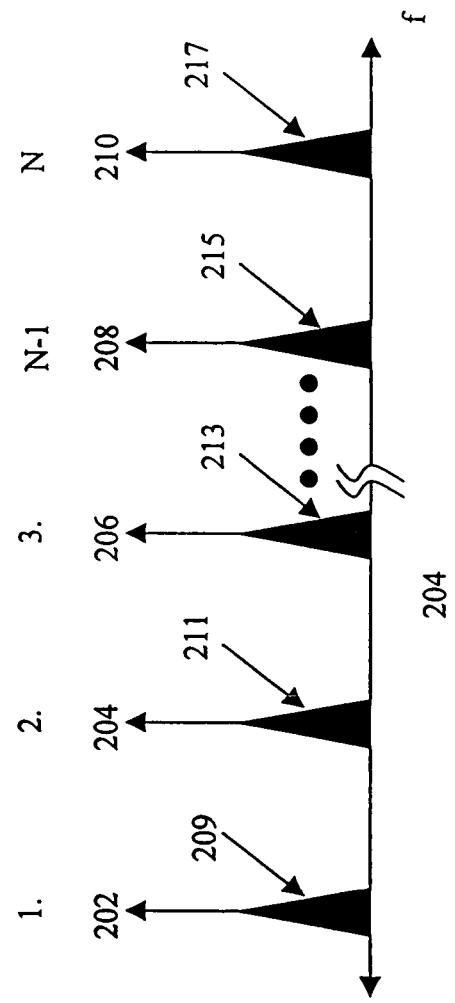

US 8,537,934 B2

SYSTEM AND METHOD FOR MULTI-CARRIER MODULATION

CROSS-REFERENCE TO RELATED APPLICATION(S)

This application is a continuation of U.S. patent application Ser. No. 09/826,969 filed Apr. 4, 2001, now U.S. Pat. No. 7,010,262, which claims benefit of U.S. Provisional Application No. 60/194,544 filed Apr. 4, 2000, the contents of which is are hereby incorporated by reference.

BACKGROUND OF THE INVENTION

Multi-carrier modulation (MCM), is widely used in applications requiring the transmission and reception of electromagnetic energy to form a transmission system. Applications can include broadcast receivers such as cellular telephone, wireless data transmission, and point to multi point data transmission systems among others. Increased utilization of a channel in an application is often achieved with multi carrier modulation transmission techniques. In multi-carrier modulation a bit stream, or information sequence, of digital data is broken up into pieces and modulated onto carriers located at different frequencies. Transmission of the electromagnetic energy may be over a transmission line or by electromagnetic radio waves.

The design of a transmission system is one of the most complex design tasks in electrical engineering, often requiring expensive circuitry in receiver and transmitter subsystems to achieve a desired performance. Attempting to prevent noise and distortion from interfering with a signal that is being transmitted is typically why high cost circuitry is utilized in a transmission system.

However, it would be more cost effective to utilize a differing modulation scheme and construct appropriate low cost circuitry to implement it. Ideally the modulation scheme would allow the appropriate circuitry to be produced inexpensively, and still provide good performance. A common form of distortion is phase noise. Phase noise is characterized by the production of a carrier frequency that is not quite at a desired set frequency, but can deviate randomly from the desired set frequency. Typically the further a possible deviation is from a set carrier frequency, the less likely the deviation is to occur. Phase noise typically becomes worse when inexpensive transmission systems are utilized. Inexpensive frequency conversion components tend to increase phase noise. Thus it would be desirable to provide a modulation system that tends to reduce distortion, while allowing inexpensive circuitry to be utilized.

SUMMARY OF THE INVENTION

A method of compensating for carrier frequency and phase errors of a received multi-carrier modulated signal. The received multi-carrier signal including modulated carriers for transmitting known data and unmodulated carriers for error correction, comprising, time domain down converting the received multi-carrier signal to base-band to provide a down-converted signal, the down-converted signal including a plurality of modulated carriers for transmitting known data and unmodulated carriers for error correction. Sampling an unmodulated carrier of the down-converted signal to provide received data samples. Providing a reference signal derived from the unmodulated carrier of the down-converted signal. And, estimating phase errors from a phase difference between the unmodulated carrier and the reference signal derived from the unmodulated carrier of the down-converted signal to provide a plurality of received sample phase error estimates for each modulated carrier.

DESCRIPTION OF THE DRAWINGS

These and other features and advantages of the present invention will be better understood from the following detailed description read in light of the accompanying drawings, wherein:

FIG. 2a is a spectrum of N independent carriers;

FIG. 2b is a spectrum of multiple independent carriers having modulated signals impressed upon them;

DETAILED DESCRIPTION OF THE INVENTION

The embodiments of the invention presented below utilize tone based carrier tracking, and are useful in any modulation system. Two types of modulation systems are commonly utilized: 1) single carrier modulation, in which an entire information signal is frequency translated to a desired band via a single carrier; and 2) multi-carrier modulation (MCM), in which an information signal, typically including an information sequence of digital data, is subdivided into subsequences. Each subsequence is assigned to one of a set of separate carriers that are individually translated in frequency to a desired band. The subsequences are typically referred to as "bins." MCM is primarily used in the transmission of digital data. However, analog transmission utilizing this technique is possible.

A problem encountered in transmitting a wideband signal that is improved with an MCM is variation in attenuation of the frequencies across the band. Variation in attenuation is characterized by a non-flat frequency response of the channel the information is being transmitted over. Examples of channels are coaxial cables, transmission lines, or the air over which a radio signal is being broadcast.

Variations in attenuation across the band are typically responsible for a type of interference called inter-symbol interference (ISI). Reduction in inter-symbol interference is achieved in MCM systems by subdividing a frequency band into individual regions. In this subdivision of the band each region is considered independent of the others. Over each subregion inter-symbol interference is typically reduced from that of a large bandwidth signal, since the attenuation varies less over the smaller band. With this technique, each band appears to have a nearly flat frequency response, thus, the distortion per signal band is typically reduced.

Typical electronic systems utilizing an MCM include cable modems, wireless transmission, cellular point to point, cellular point to multi-point transmission, DSL applications, and point to multi-point short-haul television transmission. The embodiments described below are particularly useful in wireless or cable modem applications where a large amount of data is transmitted at high frequencies. Although an MCM is more tolerant to inter-symbol interference, other problems typically arise in using an MCM such as increased sensitivity to phase noise.

Figure 1:
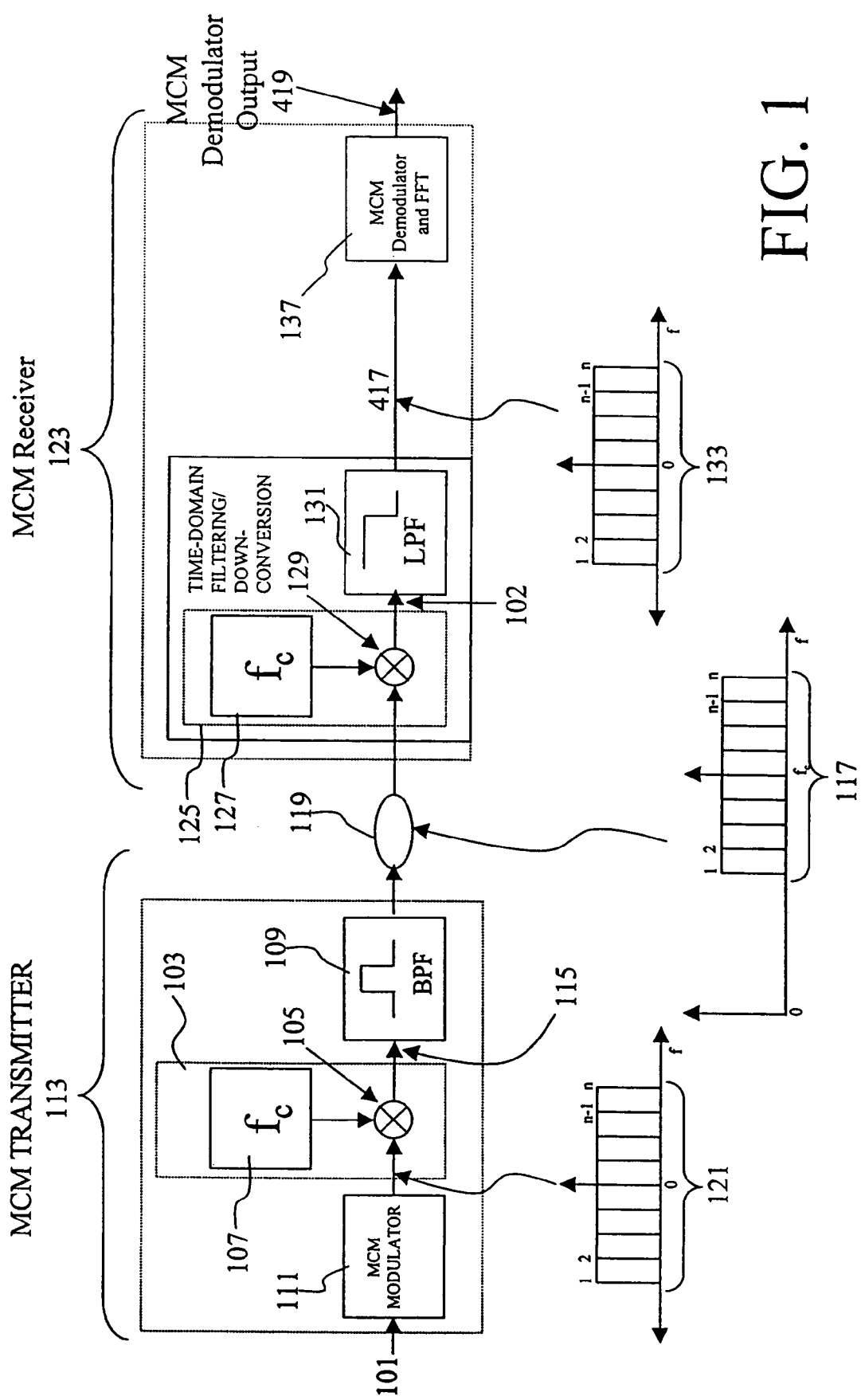
FIG. 1 is a block diagram of a multi carrier modulation system.

FIG. 1 is a block diagram of a conventional MCM system. MCM systems typically do not satisfactorily accommodate large amounts of phase noise. Because of the multiple carriers that are present in multi-carrier modulated signals inter carrier interference causes difficulty to removing phase noise by conventional techniques.

Phase noise (or phase jitter) typically arises when a signal is translated, or mixed, to a high frequency by utilizing frequency conversion circuitry, such as a mixer, or a "tuner." The term tuner as used here includes a circuit having a mixer and a local oscillator so that a signal applied to a tuner is converted in frequency. Phase noise is typically added in the mixing process. A local oscillator signal is applied to a local oscillator (LO) port of the mixer to cause the frequency conversion of a signal applied to a radio frequency (RF) port of the mixer. Through the interaction of the signals and the mixer circuitry, the signal that is outputted at an intermediation frequency (IF) output port of the mixer is a replica of the signal applied at the RF input port, but translated in frequency.

The frequency conversion circuitry of the tuner has phase noise associated with it that is transferred to the signal during the mixing process. Tuner or mixer phase noise typically arises from an inherent inability of the mixer circuitry to cleanly mix a signal from DC (or a first frequency) to a second frequency. Phase noise typically appears as a jitter or randomness, in the frequencies produced in the tuner. Phase noise is typically high in inexpensive tuners. Thus, inexpensive tuners typically produce large amounts of phase noise that often make an MCM undesirable in low cost applications.

The embodiments of tone based carrier tracking systems that are described below will typically allow low cost tuners to be utilized in cost effective MCM systems. Low cost tuners may be utilized by providing compensation circuitry for the phase noise and through manipulation of the signal by utilizing a training tone. Information to manipulate the signal is obtained from one or more training tones and processed in the digital domain utilizing digital signal processing techniques.

In an MCM system 102 a conventionally generated digital bit stream, or information sequence, 101 is input to a conventionally constructed an MCM modulator circuit 111. The output of the multi-carrier modulator circuit 121 is a series of N equally spaced modulated carriers centered about DC. Alternatively unequal spacings may be utilized. Information from the information sequence 101, or bit stream, is divided into segments, or "BINS", with each segment encoded onto each of the N independent carriers comprising signal 121.

The output of the MCM modulator 111 is input to a conventionally constructed tuner 103. Tuner 103 includes a mixer 105 coupled to frequency generator 107 at a first mixer port. The frequency generator 107 produces by conventional means an output frequency fc. The tuner converts a signal applied to a second mixer port to a signal at a third mixer port that is substantially a replica of the signal at the second port, but centered about a different frequency.

Conventional circuitry known to those skilled in the art is utilized to construct the tuner. In the embodiment shown fc is equal to 2.4 gHz. In an alternative embodiment, fc is equal to 5 gHz. However, any suitable frequency may be utilized. In the tuner, an output signal 121 of the MCM modulator 111 is upsampled, or upconverted by a conventionally constructed mixer 105 and a coupled to a conventionally constructed frequency source 107 to 2.4 gHz to form a tuner output 115.

Alternatively the MCM modulator output is upconverted by a single tuner such that it is centered about 5 gHz. Alternatively, upconversion of the MCM modulator output is accomplished using multiple tuner stages to achieve a final desired upconversion through in progressive steps.

The tuner output 115 is applied to an input of a conventionally constructed bandpass filter 109. An output of the bandpass filter 117 is a filtered version of the MCM modulator output. Signal 117, is the signal that is transmitted through a conventional transmission medium 119 such as air or a transmission line. The upconverted signal is captured by a receiver after it is transmitted through the transmission medium.

The output of the bandpass filter 109 that has been transmitted through the transmission medium 119 is conventionally down converted by a down conversion tuner 125 in the MCM receiver 123 so that the received signal may be processed by subsequent circuitry.

A down conversion tuner 125 includes a conventionally constructed frequency generator 127 outputting a frequency fc that is mixed by a conventionally constructed mixer 129 with the signal received from the output transmission channel 119, to form down converted output 102. The output 102 of the down conversion tuner 125 is applied to a conventionally constructed down conversion low pass filter 131. The output of the down conversion low pass filter forms a down conversion low pass filter output 133, that appears at low pass filter output 417. The low pass filter output 133 is similar in its modulation characteristics and carrier frequency location to the MCM modulator output signal 121.

The LPF output signal 417 is input to a conventionally constructed MCM demodulator and FFT circuit 137. In the MCM demodulator and FFT circuit 137 the data is stripped from the carriers and assigned to bins. The data from the bins is reconstructed into a recovered sequence of digital data at the MCM demodulator output 419.

The conventional sequences of modulation and demodulation described above tend to add considerable amounts of phase noise to the signal that is being modulated and subsequently recovered. A conventional MCM circuit is especially susceptible to phase noise when low cost tuners 103, 125 are utilized to lower costs.

To understand the distortion mechanisms that produce phase noise that is typically present in the receiver, the individual carriers and the signals impressed upon them in the presence of noise are described in detail, so that the need for a system and method of an MCM, and its operation will be better understood.

FIG. 2a is a spectrum of N independent carriers 202, 204, 206, 208, 210. In the embodiment shown, each carrier is equally spaced in frequency from the others. However, carriers having an unequal spacing may be utilized. In a multi-carrier system, an independent sequence of information is typically impressed upon each carrier as a modulated signal.

FIG. 2b is a spectrum of multiple independent carriers having modulated signals impressed upon them. The N independent modulated signals 209, 211, 213, 215, 217 make up a multi-carrier modulated signal. Subsequence of a data stream are typically modulated or impressed upon each carrier. The carrier signals 202, 204, 206, 208, 210 shown are substantially equal in all characteristics, but offset in frequency. The tuners (103 and 125 of FIG. 1) typically contribute phase noise to each of the carrier signals 202, 204, 206, 208, 210 and the signals 209, 211, 213, 215 and 217, that are modulated upon the carriers respectively, when they are down converted, and/or when they are upconverted. The phase noise interferes with a series of signals 209, 211, 213, 215, 217 modulated on the carrier when it is desired to remove the carriers and demodulate the information stream.

In the frequency domain, phase noise typically appears as uncertainty in the location of the carrier frequencies 202, 204, 206, 208, 210. When examined in the time domain, phase modulation, and the uncertainly in frequency it produces appears as an imperfectly formed sine wave.

Figure 2C:
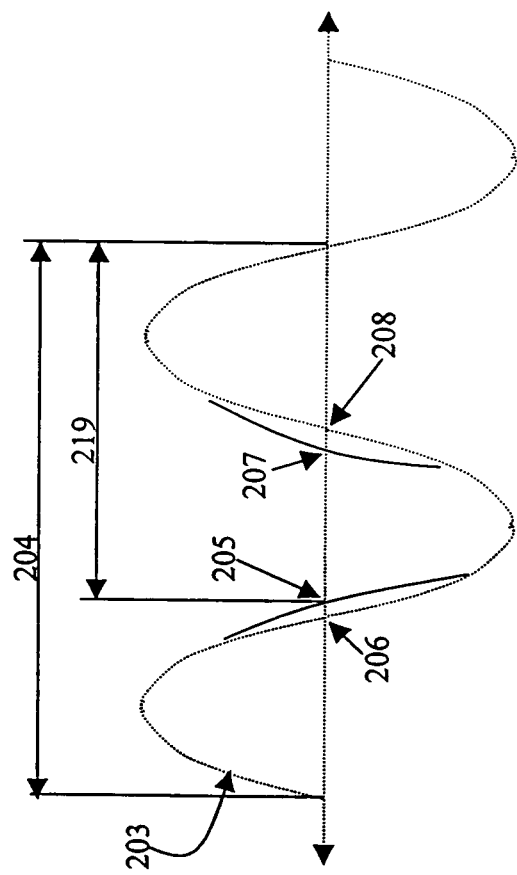
FIG. 2c illustrates the effects of phase noise on a conventional sine wave.

FIG. 2c illustrates the effects of phase noise on a conventional sine wave. As shown, a sine wave 203 that produces a frequency f, is affected by phase noise. In any given cycle 204 a sine wave may arrive late at its zero crossing 205, rather than being on time at the zero crossing 206. The late arrival causes a lower frequency $f_{low}$ to be produced at that instant. Whereas in the next, or some other cycle, the sine wave 203 may start early in crossing the zero crossing 207, causing a frequency $f_{High}$ to be produced at that instant that is higher than would normally be produced 208. The sine wave is thus phase modulated such that a beginning or ending phase is introduced into the sine wave causing the zero crossing time to be expanded 205 or contracted 207.

When viewed in the frequency domain, the probability of not obtaining a frequency that is exactly the desired frequency can be seen in a spectrum of unmodulated carriers. Most of the time the frequency generated tends to be produced correctly at the desired frequency. When viewing a frequency spectrum of a pure carrier on an instrument, such as a spectrum analyzer, most of the time a heavy line appears at the desired location indicating the carrier being measured. However, when viewing a typical carrier, an envelope, that is not part of a modulated signal, typically appears at the base of the signal. The envelope is indicative of the signal's "jittering" about the desired frequency. As distance in frequency from the desired carrier increases, the amplitude of the envelope typically decreases, indicating reduced probability of the frequency occurring farther from the carrier.

Each time a sine wave undergoes the mixing process, such as in the transmitter tuner (103 of FIG. 1), or the receiver tuner (125 of FIG. 1), phase noise tends to be added. Phase noise introduced by tuners typically causes the purity of the signal generated to degrade. When low cost tuners, often having relaxed phase noise specifications, are used phase noise typically worsens.

Phase noise tends to interfere with a signal when it is demodulated tending to cause degradation and possibly a loss of data.

In the embodiments of the invention that will be presented, a training tone tracking PLL is added to track, calculate and compensate for phase noise. In the frequency domain, the frequency spectrum tends to be cleaned up such that a series of sinusoidal signals having a frequency closer to that which is desired tends to be produced.

A current trend in circuit design is the increasing use of digital signal processing techniques (DSP) in implementing circuit designs. DSP is rapidly tending to replace the more conventional analog design techniques. Phase distortion, or phase errors, typically arise in analog circuitry such as IF and RF tuners. Single carrier techniques typically utilizes a DSP technique of processing decision data in order to combat phase distortion. Decision data refers to the estimated value of a transmitted data sequence or symbol, based on received data. There are two problems with using decision data in a multi-carrier system.

First, decision data is typically only available after a received analog signal is sampled and transformed into a digital signal that is suitable for processing with DSP circuit techniques. However, the transformation process tends to distort phase error information needed to compensate for phase errors.

Second, decision data is generated at a symbol rate present in the DSP system. The symbol rate in a multi-carrier system as compared to a symbol rate used in a single carrier system is typically N times slower for N sub-carriers. A faster rate is typically needed to make the existing phase error compensation techniques produce satisfactory results by providing a sufficiently fast rate for tracking the errors typically present. Thus, it is desirable to compensate for phase noise in the time domain prior to a conversion of the signal into the frequency domain. Time domain compensation for phase errors tends to avoid the distortion encountered after conversion to a frequency-domain signal. Also, in the time domain a much faster MCM sample rate may be utilized to track the phase errors. Typical MCM sample rates tend to be one hundred to one thousand times faster than typical symbol rates. A system that utilizes one or more training tones and a training tone tracking circuit tends to reduce phase distortion and advantageously utilize the MCM sample rate.

Figure 3:
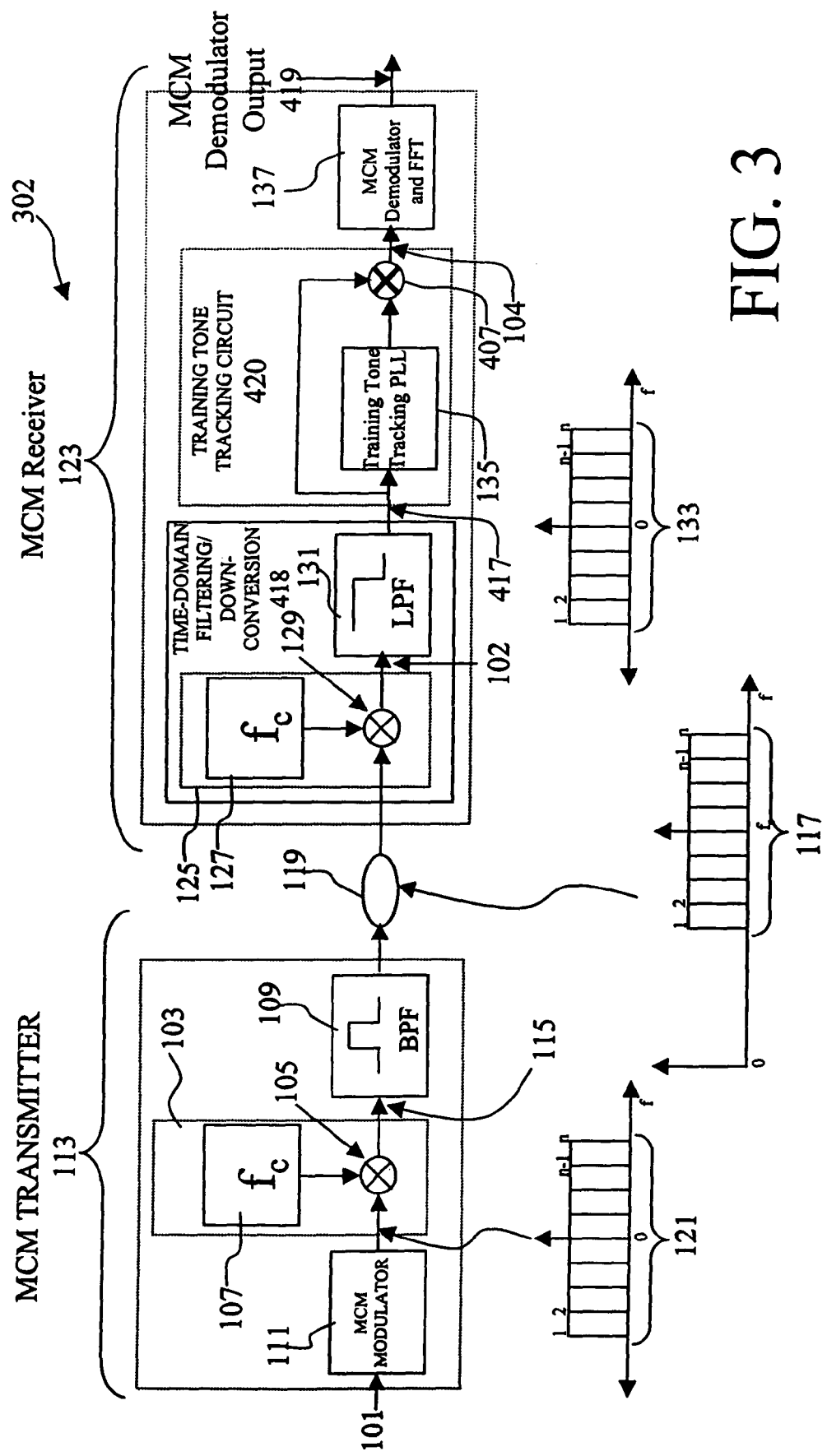
FIG. 3 is a block diagram of an MCM transmitter and receiver that advantageously utilizes training tones, and a training tone tracking circuit in a system that tends to reduce phase noise.

FIG. 3 is a block diagram of an MCM transmitter and receiver that advantageously utilizes training tones, and a training tone tracking circuit 420 in a system 302 that tends to reduce phase noise. A training tone tracking circuit 420 accepts an input signal 417 and splits the signal into a first signal, and a second signal. The first signal is applied to a first input port of a mixer 407. The second signal is applied to a training tone tracking PLL 135. An output of the training tone tracking PLL 135 is applied to a second input port of the mixer 407. An output 104 of the mixer 407 is coupled to an MCM demodulator and FFT 137. Input 417 of the training tone tracking PLL 135 is coupled as described in FIG. 1. The remainder of the circuitry of FIG. 3 is identical to the circuitry described in FIG. 1.

In the time domain, phase jitter of the signal is tracked by comparing it to a known standard. The signal being tracked is the one that is applied to the first input port of the mixer 407. The known standard is provided by the output of the training tone tracking PLL 135. The known standard is typically created by purifying the signal that is being applied to the first input port of the mixer 407. The output of mixer 407 is a "phase error free" MCM signal.

At any zero crossing, the amount of phase jitter, or phase error, present is known by comparison made in mixer 407. By applying the negative of the measured phase jitter to the signal being recovered, the phase jitter tends to be removed from a signal that will be demodulated later.

The training tone tracking PLL 135 circuitry deduces what the phase noise is at any given instant and applies its negative to the received signal such that the phase noise tends to be canceled. The error in phase is recovered from a received signal, and its negative is applied to the received signal at a later time such that phase noise tends to be reduced.

In an embodiment of the method for reducing phase noise in a received signal, a training tone is utilized to facilitate measurement of the phase noise. The training tone is placed at a convenient frequency location within the N independent signals previously described. The amplitude of the training tone is typically larger than that of the N signals present.

The training tone typically has no signal modulated into it. Due to the lack of modulation, the zero crossings of the training tone are clearly defined since uncertainty in the zero crossing caused by the information sequence encoded onto the training tone is not present. A period T of the training signal is known, and at the end of each period T, the training tone is sampled at a point in time where the zero crossings should occur. A non-zero value obtained every T seconds provides an indication of the phase error at that instant in time that phase error was caused by the frequency conversion process.

Figure 4:
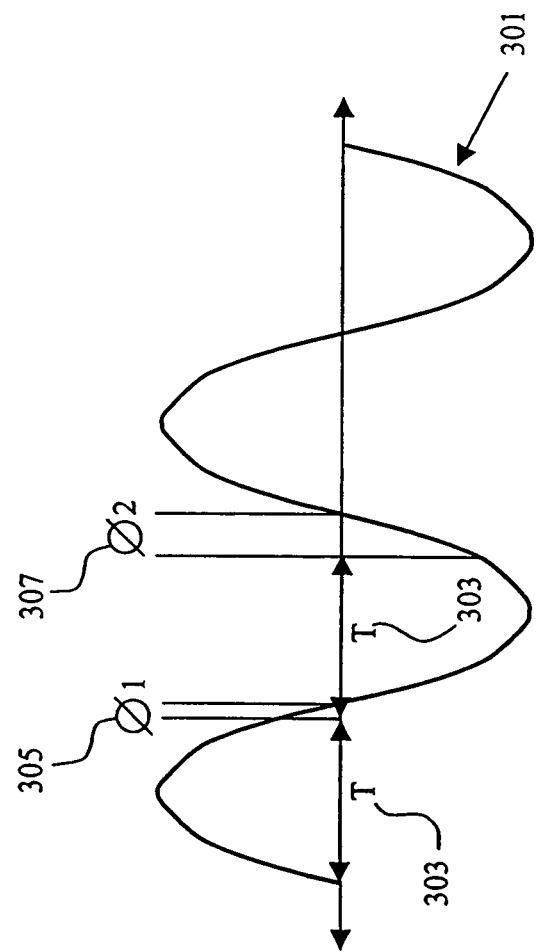
FIG. 4 is an illustration of a sinusoidal training tone signal having phase error.

FIG. 4 is an illustration of a sinusoidal training tone signal having phase error associated with it. Phase errors 305, 307 are typically measured in degrees. Phase error is the amount that the distorted sine wave differs from a desired undistorted sine wave having zero crossings at 0, 180, and 360 degrees. Alternatively, a time period T 303 may be used to mark the desired zero crossing points. For an unmodulated sine wave utilized as a training tone, the exact phase error introduced by the modulation and demodulation circuitry is measured. Next, the phase error information is utilized to create a signal having reduced phase error.

By measuring the phase error in the training tone at each calculated zero crossing, the phase error is determined. The negative of the phase error is applied to each of the N independent signals carrying information from the information sequence such that the phase distortion tends to be reduced. This is possible, even though the N independent signals are present at frequencies differing from that of the training tone because the phase distortion introduced at any one given frequency in a given cycle tends to be the same at all frequencies.

If a training tone that is similar in amplitude to the N independent signals is utilized, noise tends to be present on the training tone, interfering with accurate measurement of phase deviation of the training tone signal. In an alternative embodiment in which the training tone is equal to or slightly greater than the N independent signals in amplitude, the training tone signal is first bandpass filtered to remove noise from the training tone.

In an alternative embodiment, multiple training tones are utilized. In the alternative embodiment, every 8th tone is a training tone. In a further alternative embodiment, every 16th tone is a training tone. Equivalent training tones may be spaced as desired among a series of N independent signal carrying tones. This technique tends to reduce the noise of the training tone phase estimate.

In the alternative embodiments utilizing multiple training tones, phase information is obtained from each training tone and averaged to determine an average phase deviation at a particular instant in time. Thus, each phase estimate from each training tone will have a certain amount of noise present. The noise in each training tone is not correlated. Thus, for an embodiment having two training tones, the signal power in the phase error estimates adds coherently to four times the signal power in each phase error sample. However, since the noise power is uncorrelated, it does not sum coherently like the phase estimate, and only a doubling of the noise power is present. Thus, a 3 db gain is achieved by utilizing two training tones. In alternative embodiments, a 3 db gain is realized each time the number of training tones present is doubled.

Figure 5:
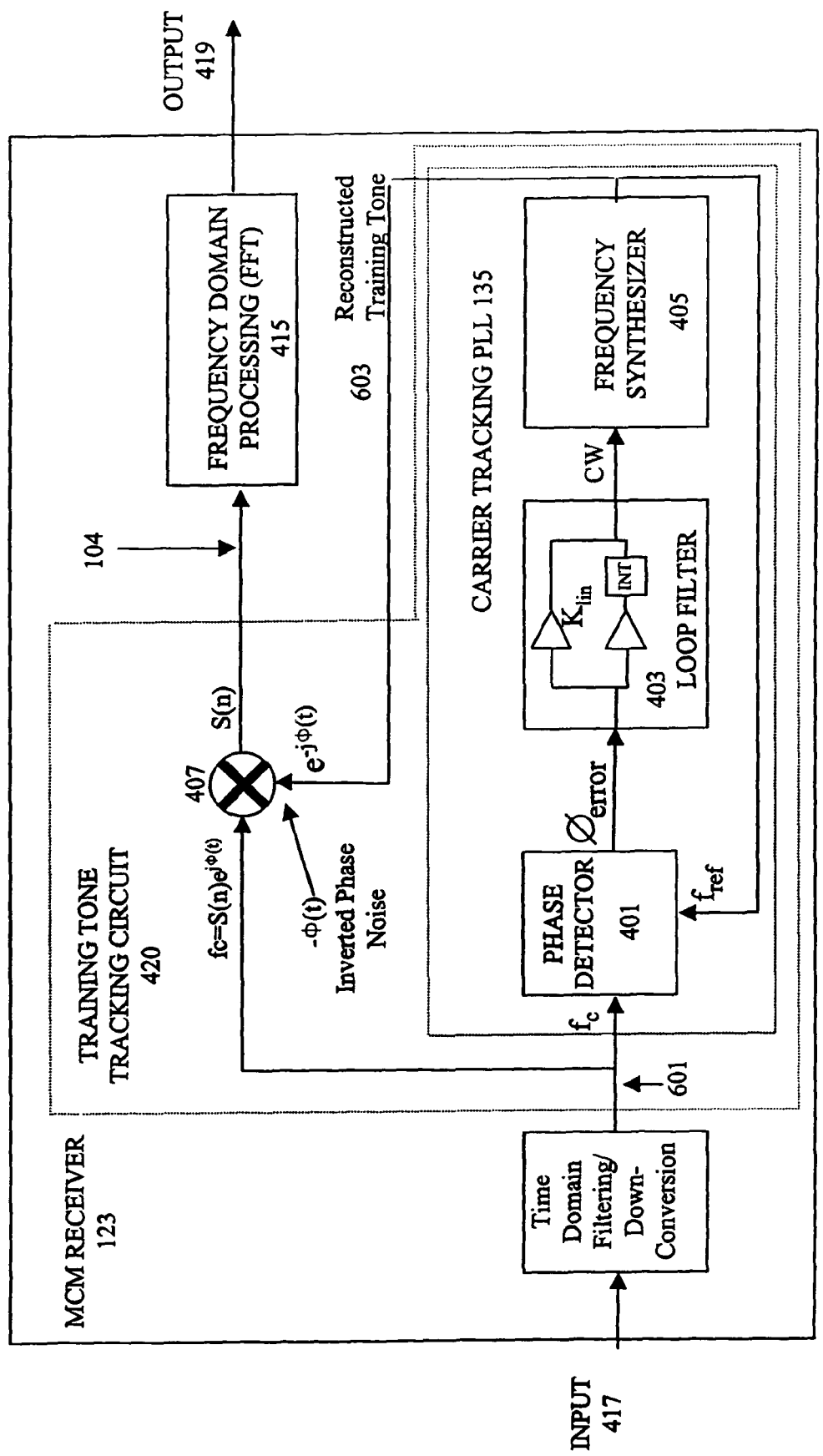
FIG. 5 is a block diagram of a second order phase lock loop used as a part of the training tone tracking PLL.

FIG. 5 is a block diagram of a second order phase lock loop used as a part of the training tone tracking PLL (135 of FIG. 3). The second order PLL is used as a carrier tracking PLL to reconstruct a training tone as it was transmitted, without phase error. The second order PLL is conventionally constructed utilizing components known to those skilled in the art. A signal $f_c$ is input to a phase detector 401. Also, a second input to phase detector 401 is a signal $f_{ref}$. The output of phase detector 401 is input to a loop filter 403. An output of loop filter 403 is an input to a frequency synthesizer 405. The output of frequency synthesizer 405 forms the signal $f_{ref}$ that is the phase detector 401 input and a mixer 407 input $e^{-j\Phi(t)}$.

The phase lock loop is often used to purify a signal without appreciatively changing the signal. The purpose of the PLL in this application is to match an internally generated signal $f_{ref}$ to a received signal $f_c = S_n e^{j\Phi(t)}$. The purpose of the PLL is to produce a clean signal that is substituted for the received signal $f_c$. Typically an incoming signal, such as $f_c$, that is being replaced possesses one or more undesirable properties such as jitter, phase noise or other undesirable properties. The signal $f_{ref}$ that is internally generated based on $f_c$ tends to have the desirable property of being a smooth signal matched in frequency and phase with the input signal $f_c$. Thus, $f_{ref}$ tends to be a clean replica of $f_c$.

The second order PLL inherently has the ability to match phase and frequency of an incoming signal in the generated signal $f_{ref}$. Phase detector 401 instantaneously provides an indication of the phase difference between incoming signal $f_c$ and reference signal $f_{ref}$. The output of the phase detector is a phase error estimate ($\phi_{error}$)

The phase error estimate $\phi_{error}$ is the difference between the phases of $f_{ref}$ and $f_c$. The phase error is applied to a conventionally constructed loop filter 403. The loop filter 403 is a first order loop filter having a proportional term $K_{lin}$ and an integrator term INT. Thus the phase errors build up in the loop filter to provide a control word (CW) output from the loop filter 403. The control word CW output is applied to an input of a conventionally constructed frequency synthesizer 405.

The second order structure allows the production of a zero frequency error with a zero phase error reproduction of $f_c$. The frequency synthesizer 405 generates as an output $f_{ref}$ that is applied to the phase detector 401 and is also designated $e^{-j\Phi(t)}$ and coupled to a mixer 407.

The carrier tracking PLL 135 of FIG. 5 provides circuitry which typically allows phase compensation to be achieved. The carrier tracking phase lock loop is used to track the training tone phase noise error and provide an estimate of phase noise.

Returning to FIG. 3, the input 417 to the training tone tracking PLL, (135 of FIG. 3), consists of a series of modulated carriers centered about base band 133. The carriers are not clean, a certain amount of phase noise or phase jitter is present on each of the down converted carriers. In the MCM demodulator and FFT (137 of FIG. 3), the instantaneous phase error determined by examining the training tone(s) will be subtracted from each of the N sampled carriers that makes up the N independent signals. The subtraction produces a series of N independent signals impressed on equally spaced carriers at the output 104 of the training tone tracking circuit 420. The carriers are relatively free of phase noise or jitter. Mathematically the process is as follows: A series of k training tones are inserted into a MCM signal. The training tones are represented as:

$$TT = TrainingTones = e^{j2\pi kn/N}$$

where: k=0, 8, 16 . . . 1016
Each carrier is identically modulated by the tuner:

$$\left(\frac{k}{8}+1\right)^{st} TrainingTone = \underbrace{e^{j2\pi kn/N}}_{TrainingTones} \underbrace{e^{j2\pi\varphi(t)}}_{PhaseNoise} = e^{j2\pi\left(\frac{kn}{N}+\varphi(t)\right)}$$

Where:

$e^{j2\pi kn/N}$ = Training tones $e^{j2\pi\varphi(t)}$ = Phase Noise $$\varphi(t) = \left[\int^t \varphi_{RAND}(t)\,dt\right](1-\alpha)$$

$\varphi_{RAND}$=a normal distribution random variable
$\alpha$=a leakage factor
Phase error is determined by demodulating the training tone:

$$TT = e^{j2\pi(kn/N+\phi(t))}$$

$$\text{Phase error} = TTe^{-j2\pi(kn/N)} = e^{j2\pi(kn/N)}$$

$$\text{Phase error} = e^{j\phi(t)} = \text{Phase Angle}$$

The phase errors of all tones after demodulation are combined.
For straight combining:

$$\text{Phase Error} = \frac{1}{(NumberofTrainingTones)}\sum TTe^{-j2\pi(kn/N)}$$

A set of k carriers having a signal impressed upon them without distortion is represented by:

$$[S(n), S(n+1), S(n+2) \ldots S(n+k)]$$

The k signals with phase noise added are represented as follows:

$$[S(n)e^{j\phi(n)}, S(n+1)e^{j\phi(n+1)}, S(n+2)e^{j\phi(n+2)} \quad . \quad . \quad . \\ S(n+k)e^{j\phi(n+k)}]$$

Next, the phase noise contribution which is identical to the phase noise of the k signals with phase noise is removed from the pilot tone. Therefore, the negative of the phase noise of the pilot is taken. The phase noise term is multiplied (407 of FIG. 5) with a distorted input signal $S(n)e^{j\phi(t)}$.

The resulting product 104 output to the MCM demodulator 137 is the undistorted message signals S(n), since the exponentials cancel.

Figure 6:
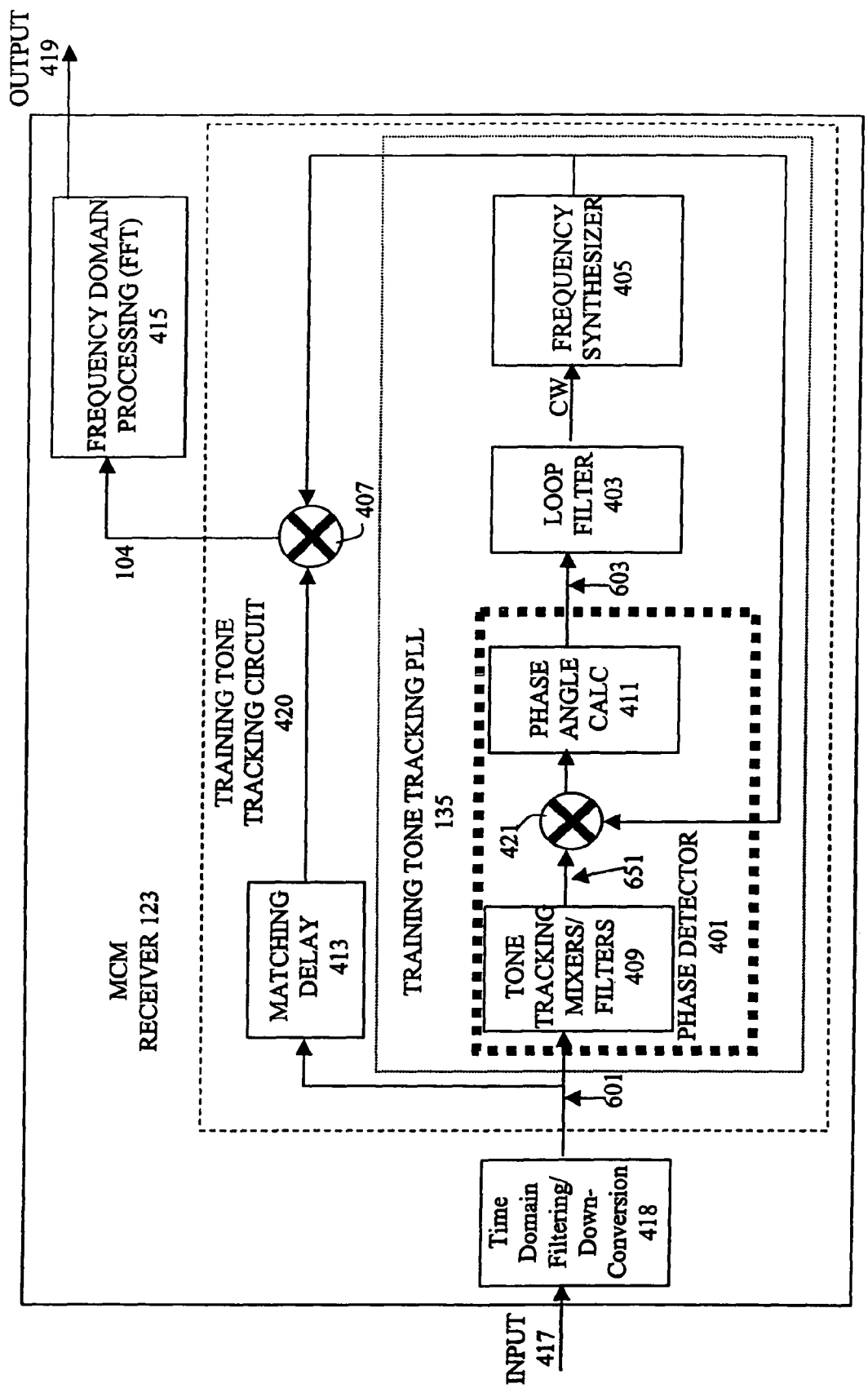
FIG. 6 is an alternative embodiment of an MCM receiver having a fast carrier tracking PLL that incorporates a matching delay circuit.

FIG. 6 is an alternative embodiment of an MCM receiver having a fast carrier tracking PLL that incorporates a matching delay circuit. A training tone tracking PLL typically has time delay associated with its operation. A PLL having a large delay tends to have a much narrower bandwidth than a PLL having a small amount of delay. Delay tends to be removed from the training tone tracking PLL by matching the delay of the carrier tracking PLL with a matching delay circuit 413.

Utilizing a matching delay circuit, the overall training tone tracking PLL is implemented such that a minimum delay appears to be present. Thus, a one delay PLL, which is the minimum delay that may be obtained for a phase lock loop is achieved. Other than the addition of matching delay circuit 413, the carrier tracking PLL, described in this embodiment, functions as previously described.

The circuit is configured as previously described in FIG. 5. However, in FIG. 6 a matching delay circuit 413 has been inserted in the line coupling the output of the time domain filtering/down conversion circuit 418 and the multiplier input 407.

The phase detector 401 of FIGS. 5 and 6 is responsible for developing an accurate phase error estimate. Three embodiments suitable for a phase detector design are presented in the following text.

A first embodiment of a phase detector 401 processes training tones, a second embodiment of a phase detector relies on a combination of training tones and modulated data signals, and a third embodiment of a phase detector utilizes data signals only.

Figure 7A:
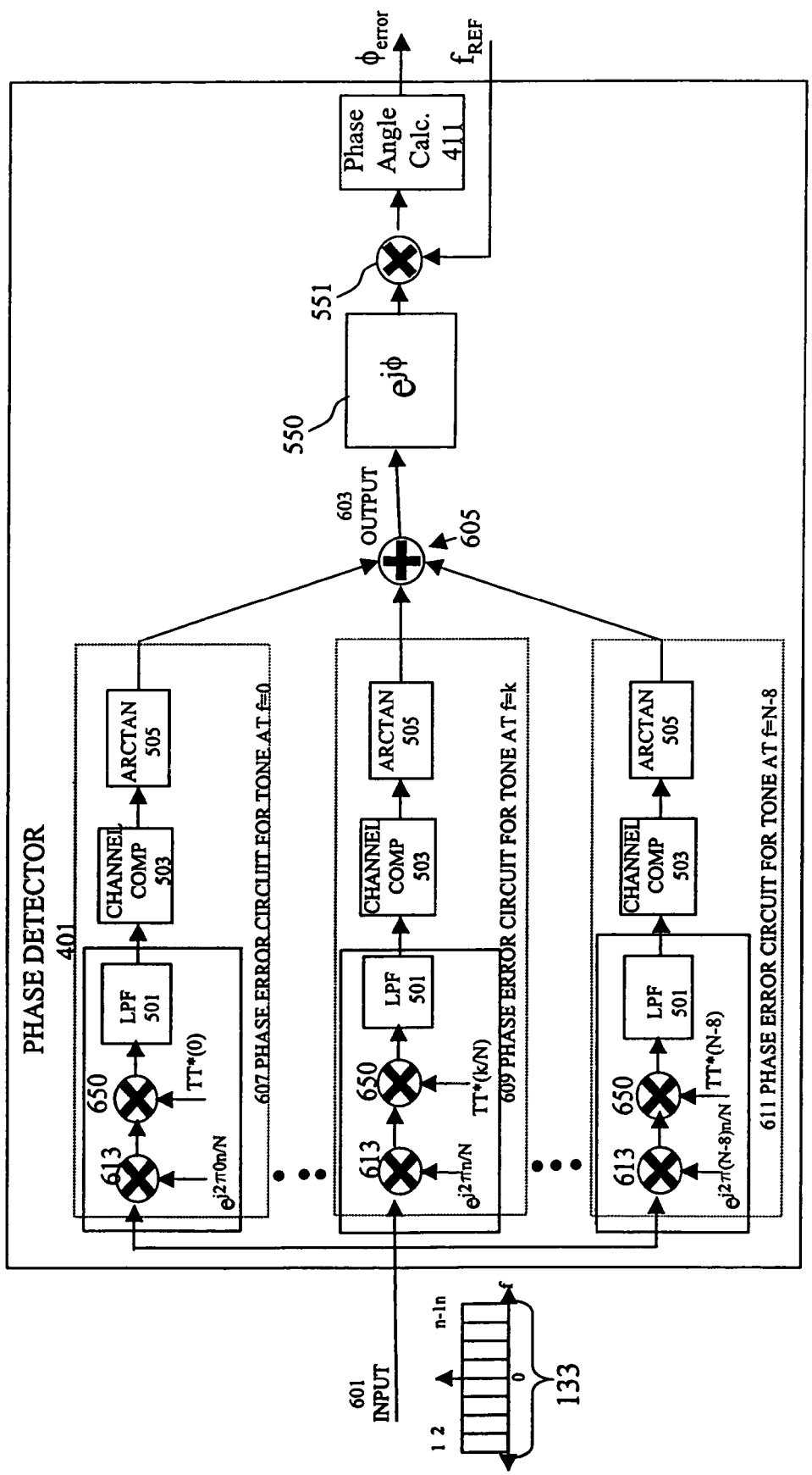
FIG. 7a is a block diagram of a first embodiment of a phase detector that processes only training tones.

FIG. 7a is a block diagram of an the first embodiment of a phase detector 401 that processes only training tones. The embodiment shown is utilized in the phase detector 401 shown in FIG. 5. The first embodiment of the phase detector 401 is capable of processing a MCM signal that employs training tones. The phase error is estimated from the phase difference of a received data sample x(n), and a reference signal f(n). Reference signal f(n) is derived from the training tone. A training tone is defined as known data that is transmitted in a sub channel. Here the training tones are a series of carriers interspersed throughout an MCM signal.

Input 601 is simultaneously coupled to phase error circuits 607, 609 and 611. Input 601 is coupled to a first mixer port of mixer 613 in each block 607, 609, 611. A second mixer port is coupled to a sinusoidal signal $e^{j2\pi 0n/N}$, $e^{j2\pi kn/N}$, $e^{j2\pi(N-8)n/N}$, of blocks 607, 609 and 611 respectively. A mixer output in each block 607, 609, 611. The mixer supplies an output coupled to an input port of a second mixer 650. In the embodiment shown a second mixer input port of mixer 650 is supplied with decision data TT(k). In an alternative embodiment the second mixer port of mixer 650 is supplied with a conjugate of the training tone, x(k). An output of mixer 650 is applied to a conventionally constructed low pass filter 501. An output of low pass filter 501 is applied to an input of a conventionally constructed channel compensation circuit 503. An output of channel compensation circuit 503 is applied to an input of a conventionally constructed arc tangent circuit 505. An output of arc tangent circuit 505 is coupled to an input of the summing junction 605. The connections described above for block 607 are identically repeated in blocks 609 and 611 for tones at f=k and f=N−8 respectively.

Summing junction 605 includes an output 603 that consists of a signal representative of a phase. Input 603 is applied to a conventionally constructed complex exponential block input. An output of the complex exponential block 550 is a signal $e^{j\phi(t)}$ a complex value. Thus, a phase is input and a complex value phasor is output from block 550. The output of complex exponential block 550 is applied to an input of a mixer 551. Mixer 551 is conventionally constructed as known to those skilled in the art. A second mixer input to mixer 551 supplies a signal $f_{ref}$ previously generated as shown in FIG. 5.

An output of mixer 551 is applied to a conventionally constructed phase angle calculation circuit 411. An output of a phase angle calculation circuit 411 consists of a signal output $\phi_{error}$.

Figure 7B:
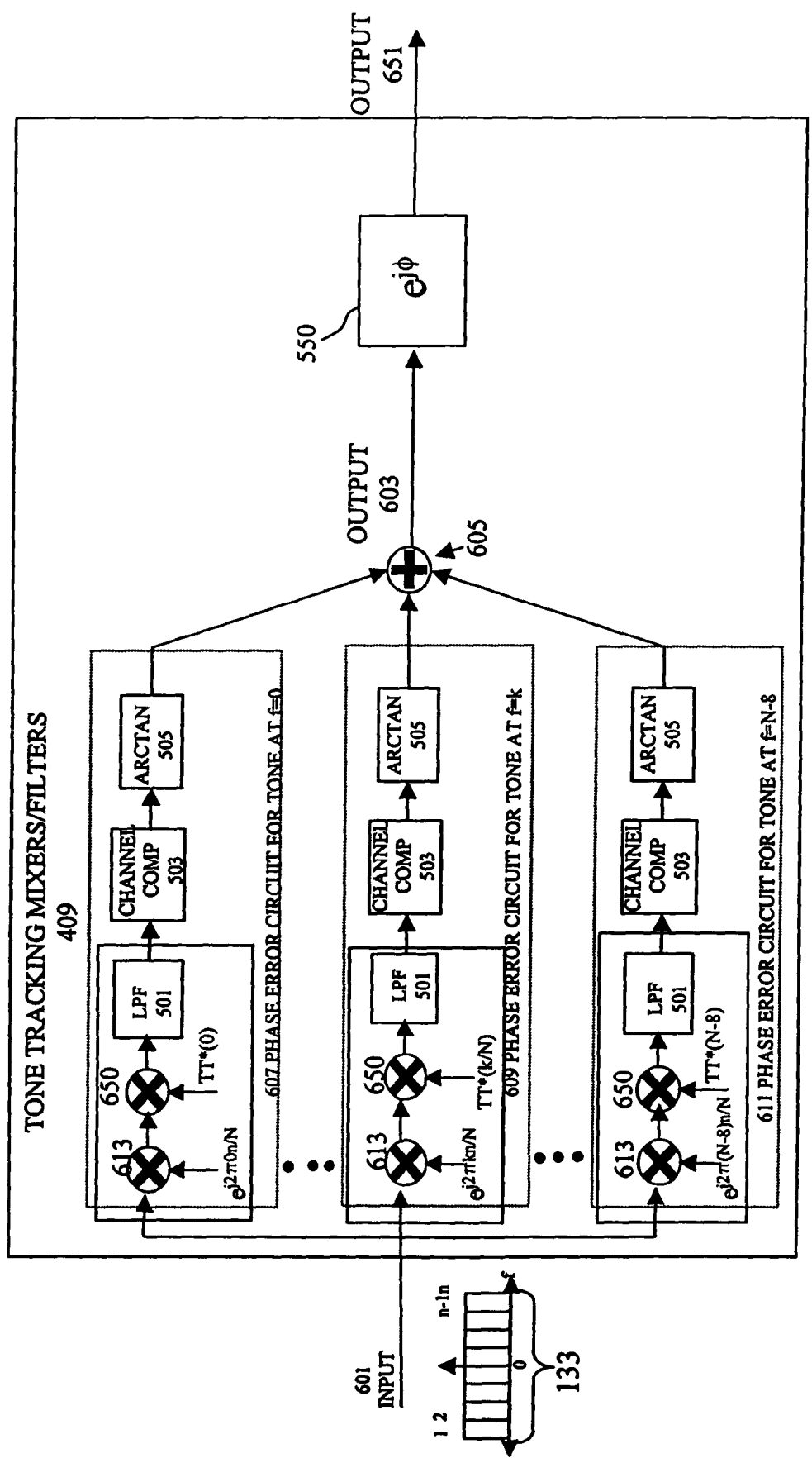
FIG. 7b is a block diagram of the tone tracking mixers/filters utilized in the phase detector circuit of FIG. 6.

FIG. 7b is a block diagram of the tone tracking mixers/filters 409 utilized in the phase detector circuit of FIG. 6. The circuitry disposed between input 601 and summing junction 605 is identical to that previously described in FIG. 7a. However, the output of summing junction 605 in FIG. 7b the phase output 603 is converted to a complex phasor in block 550 as previously described to form output 651.

Figure 7C:
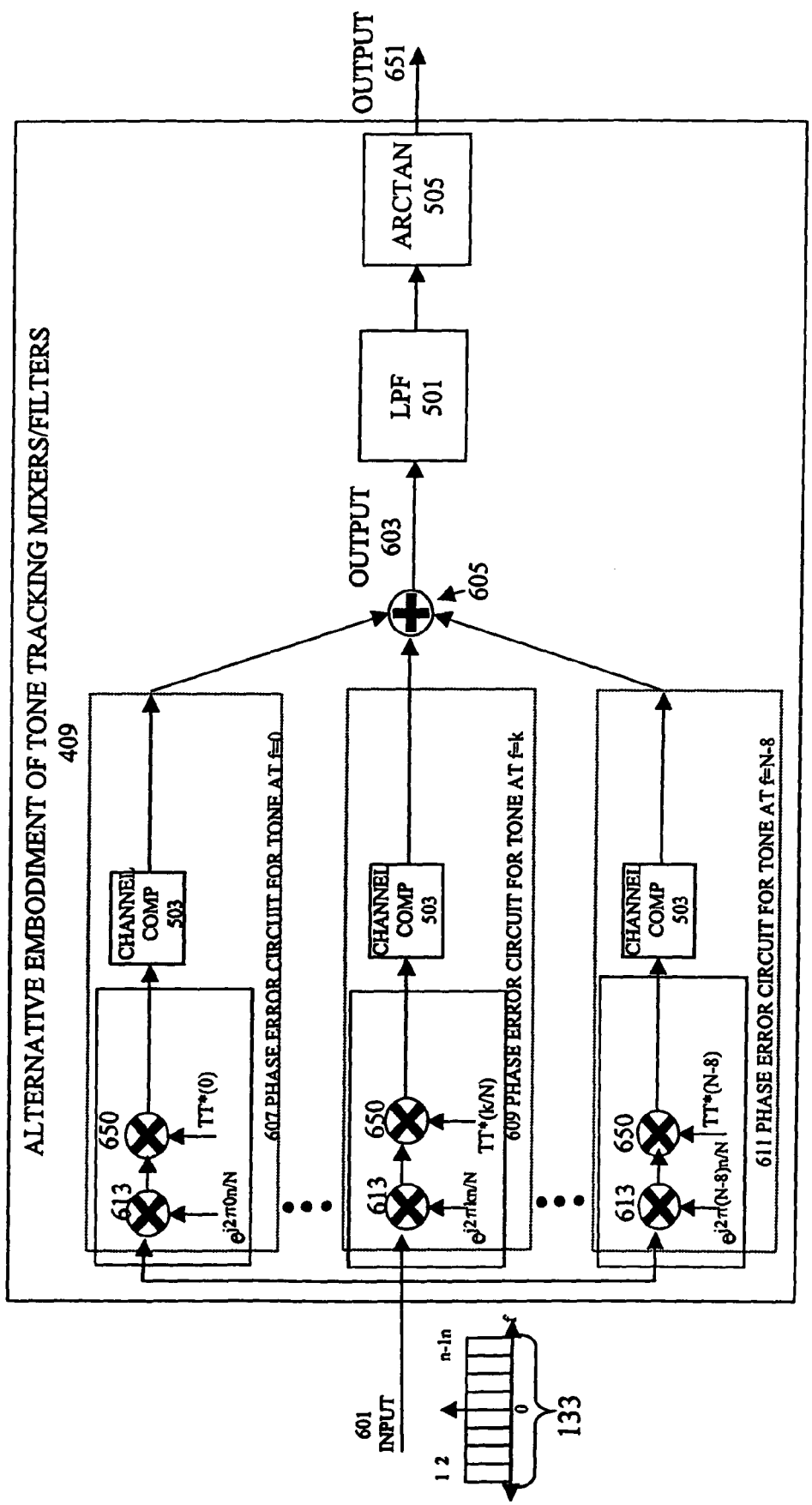
FIG. 7c is an alternative embodiment of the tone tracking mixer/filter circuit.

FIG. 7c is an alternative embodiment of the tone tracking mixer/filter circuit 409. In the embodiment shown an input 601 is simultaneously applied to phase error circuits for tones at f=0, f=k and f=N−8, 607, 609, 611 respectively. In the present embodiment blocks 607, 609 and 611 have been simplified. Each block 607, 609, 611 is identically constructed. Thus, the circuit connections in block 607 are described and are representative of the other remaining blocks.

In block 607 a mixer 613 is configured as previously described. However, an output of mixer 613 is coupled directly to a conventionally constructed channel compensation circuit 503. An output of channel compensation circuit 503 is coupled directly to a summing junction 605. Note in the above circuit block that the low pass filter previously described and the arc tangent circuit previously described have been omitted.

The low pass filter is cascaded at the output 603 of the summing junction 605. Output 603 is coupled to an input of low pass filter 501. A low pass filter output is coupled to an input of an arc tangent circuit 505. An output of arc tangent circuit 505 forms the output 651.

Figures 8A, 8B, 8C:
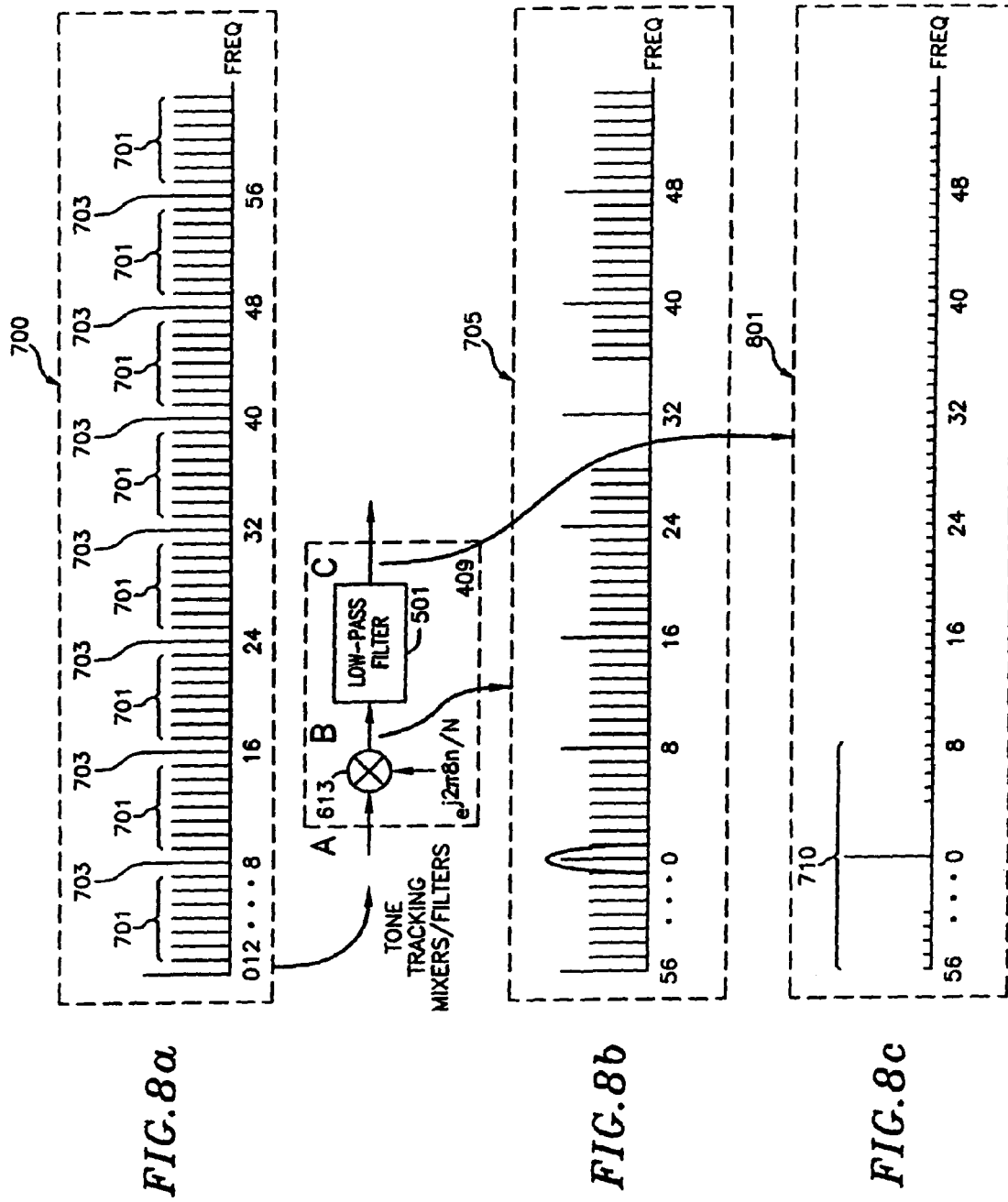
FIG. 8a is a frequency spectrum of an MCM signal comprising data signals impressed with transmitted data and training tones.
FIG. 8b is a frequency spectrum of the output of the mixer.
FIG. 8c is a frequency spectrum of a down converted and isolated training tone after low pass filtering.

FIG. 8a-c are diagrams illustrating the construction and operation of the tone tracking mixers/filters (409 of FIG. 7b) for processing a MCM signal including training tones.

FIG. 8a is a frequency spectrum 700 of an MCM signal comprising data signals 701 impressed with transmitted data and training tones 703. In the embodiment shown the training tones are present every eighth tone and are of greater amplitude than the data signals. However, in alternative embodiments the amplitude of the training tones may be equal to the amplitude of the data signals or an arbitrary amplitude relative to the data signals. The frequency spectrum 700 is applied to a first input port of a mixer (613 of FIG. 7a), where the desired training tone is mixed down to DC, or an IF frequency, by a complex sinusoid signal applied at a second mixer port as known to those skilled in the art. Down conversion of the eighth training tone is explained as an example. The remaining training tones are similarly processed.

Down conversions of the sixteenth, twenty-forth, thirty-second, fortieth, forty-eighth, and fifty-sixth training tones to DC is accomplished by selecting an appropriate signal to be applied to the second mixer port of the respective phase error circuits (607, 609, 611 of FIG. 7a). The respective mixer outputs are applied to their respective low pass filter inputs.

FIG. 8b is a frequency spectrum 705 of the output of the mixer (613 of FIG. 7a). The desired tone has been conventionally down converted to DC and the spectrum is applied to the input of a low pass filter (501 of FIG. 7a).

FIG. 8c is a frequency spectrum 710 of a down converted and isolated training tone after low pass filtering. The frequency spectrum 705 has been applied to a conventionally constructed low pass filter (501 of FIG. 7a) to produce spectrum 710 at the low pass filter output. Note that at the output 710 a residual signal level of the data signals that were adjacent to the training tone remain due to typical limitations of the filters.

The output of the low pass filter is the phase error for the training tone being examined. The signals produced by the circuitry of FIG. 8 are processed as described below.

An estimate of the received sample phase at each training tone frequency, k, is obtained by implementing a DSP circuit of the following equation:

$$RPHI(k) = \text{Lowpass Filter}((e^{2\pi jk/n} x(n)) \text{complex-conjugate}(TT(k))$$

where RPHI(k) is the received sample phase at frequency k, and n is summed over n=0 . . . N−1, and TT(k) is the known training tone value for frequency k. RPHI(k) is the signal that is output from the low pass filters (501 of FIG. 7a).

Returning to FIG. 7a, the channel compensation circuit 503 includes an input that is coupled to the output of the low pass filter 501. In practically implemented MCM systems, the received sample phase errors are distorted by the effect of a communication channel. Compensation for the received sample phase errors contained in each channel is provided. Compensation requires the channel estimate to be known at each of the training tone frequencies, k. Using empirically derived or calculated channel information, channel compensation can be applied to the received sample phase errors as follows:

$$CC\_PHI(k) = RPHI(k)/CE(k),$$

where CC_PHI(k) is the channel compensated sample phase error at frequency k, and CE(k) is the channel estimate for frequency k. The result is the output of the channel compensation circuit 503.

The arctangent circuit 505 is coupled to the output of the channel compensation circuit 503. Each of the received sample phase errors output from the channel compensation circuit is represented as a complex phasor. To convert these phasors to a phase angle it is necessary to compute the inverse tangent of each CC_PHI(k) by utilizing a DSP implementation of the following function:

$$Angle\_PHI(k) = \text{arctangent}[CC\_PHI(k)]$$

In practice, adequate accuracy tends to be obtained and it is typically preferable to approximate the phase angle as:

$$Angle\_PHI(k) = \text{imaginary part}[CC\_PHI(k)]$$

The result of the process described above is the signal appearing at the output of ARCTAN circuit 505.

Each sample phase angle is derived from each of a plurality of training tones applied to a plurality of phase error circuits 607, 609, 611. Three phase error circuits 607, 609, 611 to process the training tones are shown. However, any number of phase error circuits may be utilized.

At summing junction 605 a total received sample phase error estimate is produced by adding each of the received sample phase angles. The total received sample phase error is given by the following equation:

$$PHI = \Sigma[Angle\_PHI(k)]$$

where k is a set of indices for all training tones. The indices define the ordinal position of the training tones in the MCM signal. The result of this equation is output 603.

FIG. 7c is an alternative embodiment a more efficient process described by the equation below, and implemented with conventionally constructed circuitry utilizing conventional DSP techniques, is theoretically identical to the equation above, but tends to be more computationally efficient.

$$RPHI = \text{Low-pass Filter} \sum \left[ \text{conjugate}\left(\frac{TT(k)}{CE(k)}\right)(e^{j2\pi kn/N} x(n)) \right]$$

Phase error estimate=PD(n)=arctan[RPHI] approximated by imaginary [RPHI].

Continuing with FIG. 7a, the circuitry for carrying out the processes described above is accomplished by utilizing conventional analog and digital signal processing techniques.

Input 601 includes a series of tones centered about a baseband frequency that are applied simultaneously to a plurality of phase error circuits 607, 609, 611. The phase error circuits are dedicated to processing a tone at f=0, f=k, and a tone at f=N−8, respectively where N is the total number of carriers present. The outputs of each of the plurality of phase error circuits are coupled to a conventionally constructed summing junction 605. The summing junction 605 includes an output 603.

Each of the phase error circuits 607, 609, 611 includes a mixer 613 having a first input coupled to input 601, a second mixer 613 input. A mixer output is coupled to an input on a conventionally constructed low pass filter 501. The low pass filter 501 includes an output coupled to an input of a conventionally constructed channel compensation circuit 503.

The channel compensation circuit 503 includes an output coupled to an input of an arc tangent circuit 505. The arc tangent circuit 505 includes an output coupled to the summing junction 605. The arc tangent circuit is conventionally constructed and performs the function of computing the arc tangent of a signal applied to it.

The second mixer input to the mixer 613 in the "phase error circuit for a tone at f=0", 607 is a sinusoidal signal $e^{j2\pi 0 n/N}$. The second mixer input for the mixer 613 in the "phase error circuit for a tone at f=k", 609 is a sinusoidal signal $e^{j2\pi k n/N}$. The second mixer input of the mixer 613 in the "phase error circuit for a tone at f=N−8", 611 is the sinusoidal signal $e^{j2\pi(N-8)n/N}$.

Training tones of different frequencies that are included in input signal 601 are applied to the phase detector 401. Each of the training tones is separated by simultaneously applying the input signal 601 to all of the mixers 613. Each mixer in each phase error circuit 607, 609, 613 has a second input frequency that mixes the training tone of interest to DC. The DC signal representative of each training tone is low pass filtered leaving only a DC representation of the desired training tone. With this technique, phase and frequency offset are corrected.

At each training tone frequency there often tends to be frequency specific distortion present on the training tone. In an embodiment of the invention at each training tone present, an amplitude adjustment, and a phase adjustment may be generated to compensate for the channel.

Based on the transmission characteristics of channel, the signal without phase noise is still expected to have a differing amplitude and phase attributable to the channel that the signal is being transmitted through. Thus, at the output of the channel compensation circuits 503, a signal having no phase noise would have a value of zero. A non-zero value at the output of the channel compensation circuit indicates the presence of phase noise.

The signal output from the channel compensation circuit 503 is applied to an arc tangent circuit 505 where the arc tangent of the output of the channel compensation circuit is calculated. The channel compensation circuit output is a complex-valued signal, and by performing an arc tangent processing, the output of the arc tangent circuit provides the phase.

The output of the summer 605 provides a coherently summed phase error that is applied to a mixer (421 of FIG. 6) LO port.

Returning to FIG. 6, an IF port of each mixer 421 is coupled to a conventionally constructed phase angle calculation circuit 411. An output of the phase angle calculation circuit 411 is coupled to an input of a conventionally constructed loop filter 403. An output of loop filter 403 is coupled to an input of a conventionally constructed frequency synthesizer 405. An output of the frequency synthesizer 405 is coupled to an RF port of mixer 421.

The output of frequency synthesizer 405 is also coupled to an RF input port of conventionally constructed mixer 407. An LO port of mixer 407 is coupled to an output of a conventionally constructed matching delay circuit 413. An input of matching delay circuit 413 is coupled to input 417. Input 417 is also coupled to tone tracking mixers/filters 409. An output of tone tracking mixers/filters 409 is coupled to an input of mixer 421.

An IF output of the mixer 407 is coupled to a frequency domain processing (FFT) 415. The output of frequency domain processing (FFT) forms output 419.

Figures 9A, 9B, 9C:
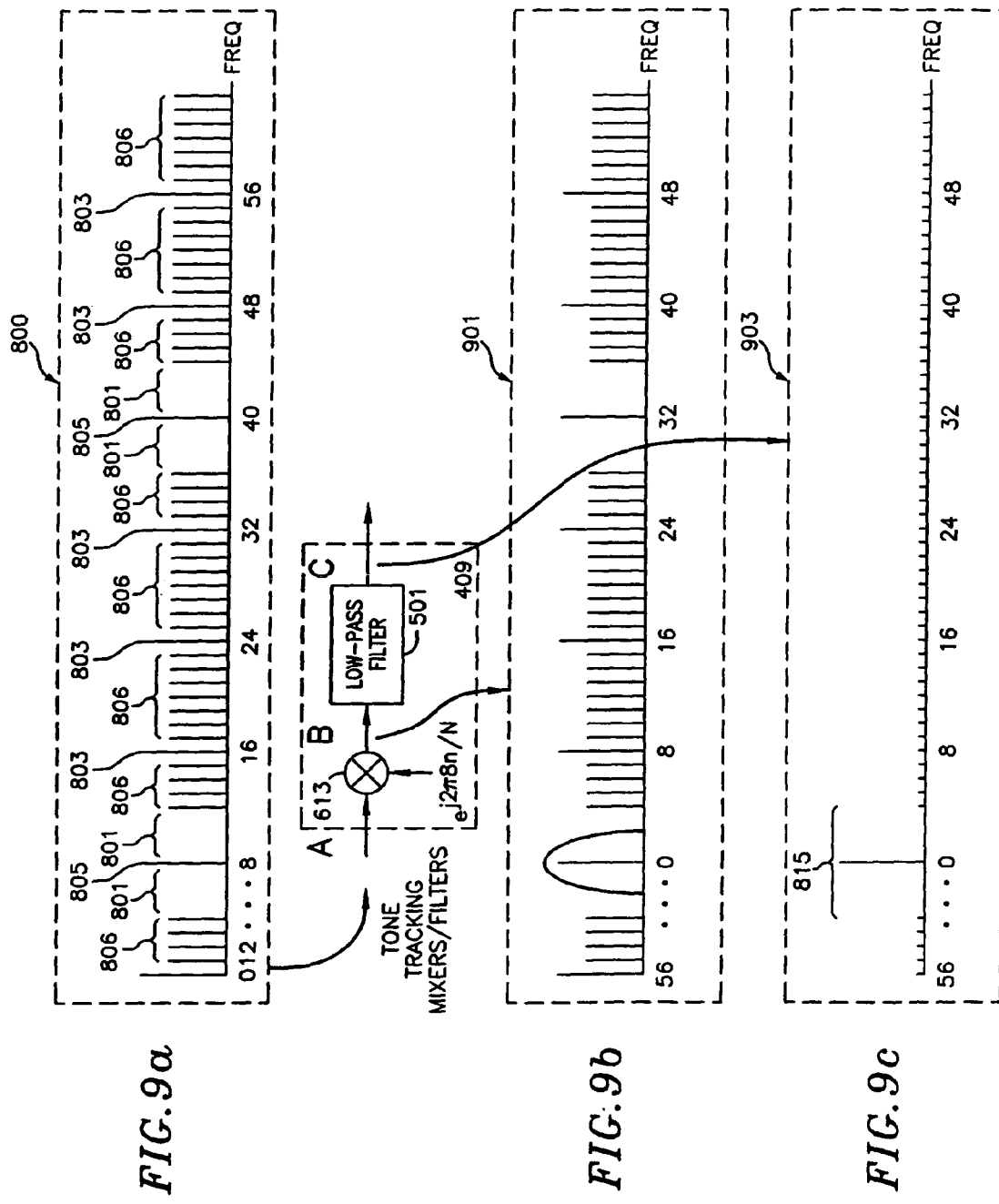
FIG. 9a is a diagram of a spectrum that is applied to a tone tracking mixers/filters circuit.
FIG. 9b is a frequency spectrum of the output of the mixer.
FIG. 9c is a frequency spectrum of a down converted and isolated training tone after low pass filtering.

In the embodiment just described above, training tones are present every 8th tone in the evenly spaced multi-tone spectrum. Phase estimates were thus calculated every 8th tone of the end independent signals present at the input as follows:

FIGS. 9a-9c is a block diagram of the first embodiment of the phase detector and the processing of training tones alone, in which data signals near the training tone have been deleted. Recall that in FIG. 8c the signal remaining after low pass filtering 710 by the low pass filter (501 of FIG. 7a) included residual data signals with the desired training tone.

Residual signals are due to limitations of the low pass filter 501. The skirts of the low pass filter 501 are typically not sharp enough to eliminate interference caused by the adjacent data signals. The residual data signals show up as noise interfering with a desired signal's reception. In the embodiment shown the transmitted signal is modified at the transmitter (113 of FIG. 3) such that data signals adjacent to training tones are nulled or zeroed so that they are not used. Removing data signals adjacent to the training tones improves the effectiveness of the low pass filtering in separating phase information of the training tone from system noise.

Equivalently a subset of training tones including only some of the training tones utilized may have adjacent data signals zeroed. In the subsequent receiver circuitry only the training tones with adjacent zero data signals are used for carrier frequency/phase error compensation.

FIG. 9a is a diagram of a spectrum 800 that is applied to a tone tracking mixers/filters circuit (409 of FIG. 7b). A series of data carriers impressed with data 806 have training tones 805, 803 interspersed among them. A subset of the training tones 805 have adjacent data carrying channels 801 suppressed.

FIG. 9b is a frequency spectrum 810 of the output of the mixer (613 of FIG. 7a) in which a spectrum from which data signals adjacent training tones have been eliminated. In the example shown the eighth training tone has been down converted to DC, or zero frequency. The down converted spectrum 810 is applied to a low pass filter (501 of FIG. 7a).

FIG. 9c is a frequency spectrum 815 of a down converted and isolated training tone after low pass filtering. The frequency spectrum 810 has been applied to a conventionally constructed low pass filter (501 of FIG. 5) to produce spectrum 815 at the low pass filter output. Note that the residual signal level of the adjacent data signals shown in FIG. 8c are not present in this spectrum.

A second embodiment of a phase detector utilizes a combination of training tones and data information to make data decisions (in addition to training tone information, when available) for carrier frequency/phase tracking. A signal input to such a receiver may or may not have training tones associated with it. The advantages of using data information is that the technique can be used for MCM systems that do not employ training tones and the power of coherent addition of phase information from independent subchannels is further emphasized.

When using data tones for carrier frequency/phase tracking a typical obstacle is that the data information is not known at the receiver until after a frequency domain transformation has been performed. Frequency and phase information is not available at a time when the MCM signal is still a time-domain signal and deriving the carrier frequency/phase compensation would be straightforward.

A two-pass approach is used to process the MCM signal utilizing a combination of training tones and data information to derive frequency and phase information. First, a received MCM signal is demodulated using either conventional MCM techniques (where no carrier tracking is performed). In an alternative embodiment, on the first pass the signal may be demodulated using a variation of a training tone driven carrier-tracking loop. The primary goal of the first pass is to determine MCM data decisions, x(k). These data decisions may be compromised by carrier frequency/phase errors, and therefore some incorrect decisions may be included, which are stored in a 1 MCM block memory delay for time domain data.

On the second pass, the originally received data is again demodulated. However, on this pass, carrier tracking is performed using a data directed technique. The data directed techniques use exactly the same mathematics described for the first embodiment, except that phase estimates of the received signal are obtained for every sub-channel frequency that contains a data signal in addition to training tone signals. Each crrier is stripped of modulation in the second pass before the phase comparison is made. The phase estimates are compared with the expected phase and the phase errors are coherently combined. Coherent combination of phase errors is accomplished using decision data, x(k), obtained from the first pass to replace TT(k) (for each k where TT(k) is not available).

An improvement in performance is typically observed when training tones are spaced away from information carrying tones. In an embodiment, gaps are left just near training tones that are utilized for determination of phase error estimation. By eliminating training tones, hardware simplification is realized by eliminating one channel typically dedicated to the processing of one training tone.

In the third alternative embodiment, tones carrying data are used as training tones. Training tones without modulated data waste power since the carrier carries no information. In order to satisfactorily use a data tone as a training tone, first the transmitted data must be deduced from the data tone that will potentially serve as a training tone.

First an entire block of data is demodulated. All of the data values are determined to reconstruct the transmitted data stream.

The recovered data stream is then re-modulated onto a set of carriers. The re-modulated information allows the originally transmitted tones to be recovered without the modulated data. Thus, every single information tone may be treated as a training tone because the carrier has been separated from the data stream. The third embodiment of a phase detector utilizes data information only.

Figure 10:
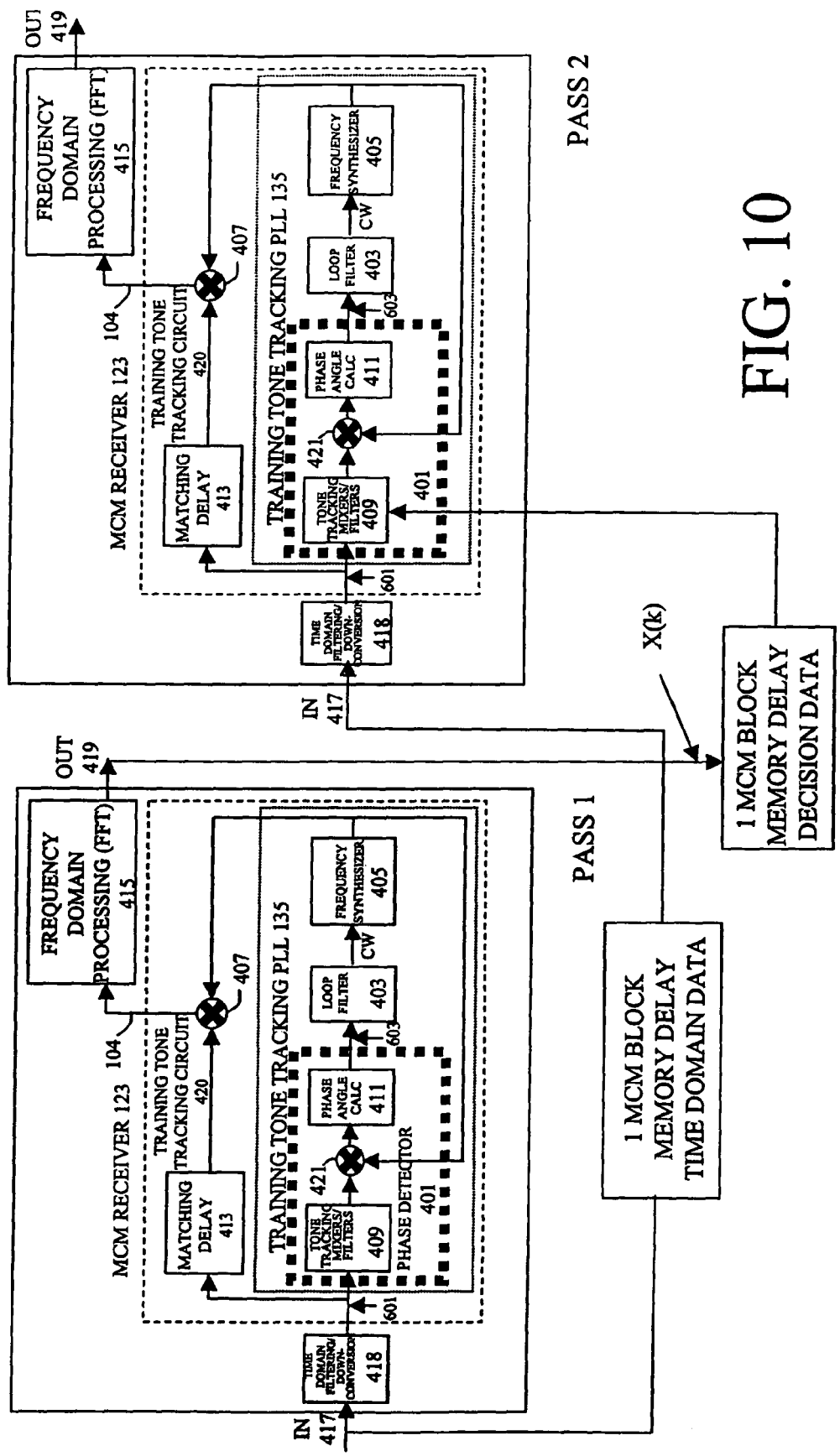
FIG. 10 is a block diagram of a two pass modulation technique.

FIG. 10 is a block diagram of a two pass modulation technique. Multi-carrier data is segmented into blocks of data. A block of data is passed through a receiver to provide initial correction of phase noise and to provide one collected block of decision data.

The output of the receiver is stored in a one MCM block memory delay decision data block. The block of stored data represents the best estimate of which data was actually transmitted. In addition an entire set of input data is stored in a one MCM block memory delay block. The data stored in unmodulated data that is applied to a second replicated receiver.

The output of the one MCM block memory delay is input to a second receiver where it is processed as previously described. The second pass utilizes decision data to drive a tone tracking PLL disposed in the second receiver. The output of the one MCM block memory delay consists of in signals that are applied to the tone tracking mixers/filters 409 at each training tone input to mixer 650. The method shown in FIG. 10 advantageously allows data from every bin to be utilized to develop the training tone estimate. All bins instead of N/8 bins may be utilized to develop phase estimates. Thus a 3 dB improvement for every doubling of the number of bins being utilized is obtained. In the embodiment described a combination of training tones and modulation data may be utilized to produce a phase error estimate. Alternatively, training tones are not needed in this embodiment to produce a phase error estimate.

Figure 11A:
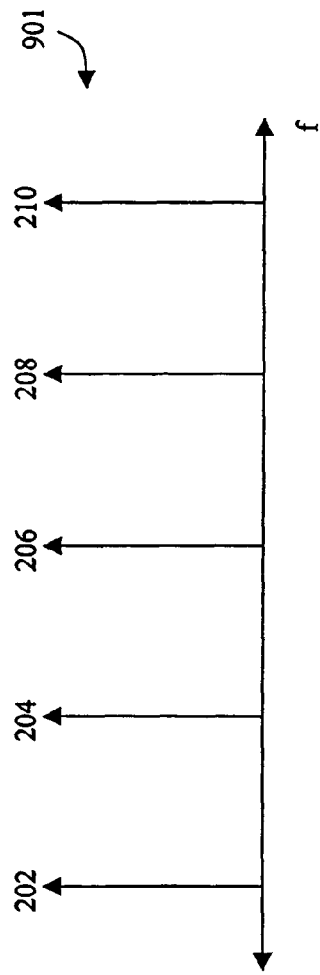
FIGS. 11a, 11b, and 11c illustrates the processing steps of the third embodiment.
Figure 11B:
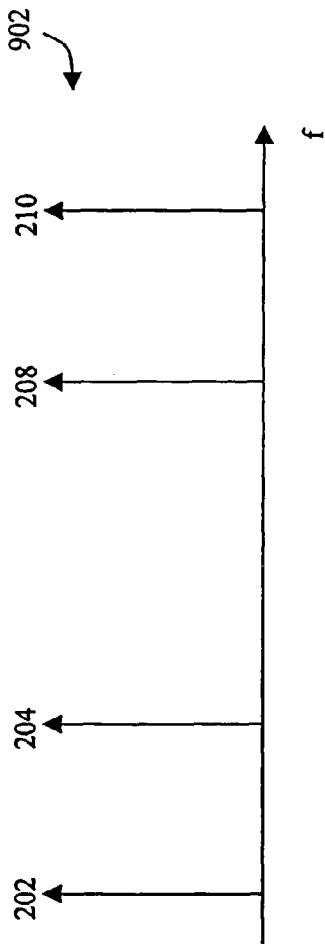
Figure 11C:
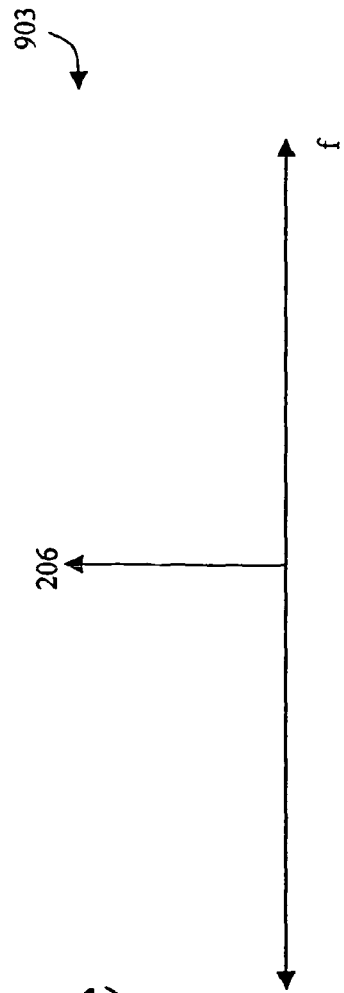

FIGS. 11a, 11b and 11c illustrates the processing steps of the third embodiment. "Known" information, either in the form of training tones or data decisions, may be used to construct a re-modulated signal. The re-modulated signal is constructed to contain all information except that of the tone of interest. The re-modulated signal is then subtracted from the total MCM signal, to remove unrelated information from the tone of interest. Phase angle estimation may then be performed on the "cleaned" tone.

First a technique is used whereby the data decisions are determined, such as was explained for the second embodiment above. It is desired to determine the phase error at an arbitrary frequency k. We may construct a complementary re-modulated signal that contains the entire MCM signal, except for the signal at tone k, as follows:

$$\text{Remod\_sig\_}k(n)=[\Sigma e^{2\pi kn/N}X(m)]$$

where Remod_sig_k(n) is the complementary re-modulated signal for frequency k, and m is summed over m=0 ... N−1, where m does not equal k.

The re-modulated signal is subtracted where m from the total received MCM signal, to yield a signal that is very good estimate of the signal at frequency k.

$$\text{Est\_sig\_}k(n)=MCM(n)-\text{Remod\_sig\_}k(n)$$

where Est_sig_k(n) is the estimate signal at frequency k.

The phase angle estimate at frequency k is determined by appropriately processing Est_sig_k (low-pass filtering, channel compensation and arctangent calculation) as described in the first embodiment. This can be performed at all frequencies (re-computing Est_sig_k for each frequency), and the phase angles coherently summed.

The technique described in this section may be performed without training tones if data decisions are made available. The techniques may also be employed without data tones, if training tones are available.

Each tone typically contributes interference to its neighboring tone. This interference is termed inter-carrier interference (ICI).

Multiple techniques are available for an MCM. If perfect band pass filters were available, no inter carrier interference would occur. However, in practically realizable bandpass filters, a transition band is present. Instead of bandpass filtering, a FFT of a data sequence is taken. The spectrum taken appears as a sinx/x, or sync response. In the digital domain, the nulls of the sync function are arranged such that the nulls fall on the location of the nearest neighboring signal that is be present. If the phase noise or frequency error is present, the neighboring signals will not fall exactly on the nulls of the sync function, and there will be interference. Thus, the interference arises due to the fact that a perfect spectral line is not present for each carrier. It is desirable to eliminate ICI.

The entire sequence of data is demodulated. The original information sequence is recovered. Next, a re-modulation of the entire signal is performed. Re-modulation of the signal would result in filling of all frequency bins available. In this embodiment, we are interested in one frequency bin.

A modified MCM modulator is used to regenerate the data sequence with the additional property of having the carrier of interest eliminated from the sequence. The original sequence has the re-constructed sequence subtracted from it. The resultant signal is a desired training tone signal without the interference of the other carriers. The process is repeated utilizing multiple MCM modulators for each carrier sought to be recovered. The phase information is extracted from a carrier recovered in this manner and then applied to the training tone tracking PLL for recovery of phase information.

What is claimed is:

1. A multi-carrier modulated signal receiver that compensates for carrier frequency and phase errors in a received input signal, comprising:
    a training tone tracking circuit configured to accept the input signal and to split the input signal into, a first signal and a second signal, wherein the input signal includes an unmodulated carrier as a training tone, wherein the training tone includes information about the carrier frequency and phase errors;
    a mixer configured to receive the first signal at a first input port of the mixer;
    a training tone tracking phase locked loop configured to receive the second signal, to use the training tone to determine and remove the carrier frequency and phase errors from the input signal, and to provide an output signal to a second input port of the mixer; and
    a multi-carrier demodulator and fast Fourier transformer configured to receive an output of the mixer and produce a demodulated output signal.

2. The multi-carrier modulated signal receiver of claim 1, further comprising a delay circuit configured to delay the first signal by a time equal to a delay of the training tone tracking phase locked loop.

3. The multi-carrier modulated signal receiver of claim 1, wherein the training tone tracking phase locked loop comprises:
    a phase detector configured to receive the second signal, wherein the phase detector comprises:
        a first phase error circuit configured to generate a first phase error signal for a first subcarrier;
        a second phase error circuit configured to generate a second phase error signal for a second subcarrier;
        a summing junction configured to combine the first and second phase error signals; and
    a frequency synthesizer coupled to the second input port of the mixer; and
    a loop filter coupled between the summing junction and the frequency synthesizer.

4. The multi-carrier modulated signal receiver of claim 3, wherein the phase detector further comprises a low, pass filter coupled between the summing junction and the frequency, synthesizer.

5. The multi-carrier modulated signal receiver of claim 3, wherein the first phase error circuit is tuned to a subcarrier frequency of the input signal.

6. The multi-carrier modulated signal receiver of claim 3, wherein the first phase error circuit is tuned to the first subcarrier and the second phase error circuit is tuned to the second subcarrier, and wherein there are seven subcarriers between the first subcarrier and the second subcarrier.

7. The multi-carrier modulated signal receiver of claim 3, wherein the first phase error circuit is configured to generate the first phase error signal based on decision data.

8. The multi-carrier modulated signal receiver of claim 3, wherein the second phase error circuit is configured to generate the second phase error signal based on decision data.

9. The multi-carrier modulated signal receiver of claim 3, wherein the first phase error circuit is tuned to a first subcarrier that is adjacent to a nulled subcarrier.

10. The multi-carrier modulated signal receiver of claim 3, wherein the loop filter is a first order loop filter.

11. The multi-carrier modulated signal receiver of claim 1, wherein the training, tone tracking phase locked loop is further configured to determine the carrier frequency and phase errors at any given instant using the training tone and apply a negative of the carrier frequency and phase errors to the input signal such that the carrier frequency and phase errors are substantially canceled.

12. The multi-carrier modulated signal receiver of claim 1, wherein the input signal includes a plurality of unmodulated carriers as training tones.

13. The multi-carrier modulated signal receiver of claim 12, wherein every eighth tone comprises one of the training tones.

14. The multi-carrier modulated signal receiver of claim 12, wherein phase information is obtained from each of the plurality of training tones and is averaged to determine an average deviation at a particular instant in time.

15. The multi-carrier modulated signal receiver of claim 12, wherein a 3 db gain is produced by utilizing two training tones.

16. The multi-carrier modulated signal receiver of claim 12, wherein a 3 db gain is produced each time a number of training tones present is doubled.

17. The multi-carrier modulated signal receiver of claim 1, wherein the input signal is received from a multi-carrier modulated signal transmitter.

18. The multi-carrier modulated signal receiver of claim 1, wherein the training tone tracking phase locked loop includes a second order phase locked loop.

19. The multi-carrier modulated signal receiver of claim 1, wherein the training tone tracking circuit includes a matching delay circuit.

20. The multi-carrier modulated signal receiver of claim 1, wherein the training tone tracking circuit, the mixer, the training tone tracking phase locked loop, and the multi-carrier demodulator and fast Fourier transformer are implemented using digital circuitry and digital processing techniques.

* * * * *

UNITED STATES PATENT AND TRADEMARK OFFICE
CERTIFICATE OF CORRECTION

| | | |
|---|---|---|
| PATENT NO. | : 8,537,934 B2 | Page 1 of 1 |
| APPLICATION NO. | : 11/331520 | |
| DATED | : September 17, 2013 | |
| INVENTOR(S) | : Joshi et al. | |

It is certified that error appears in the above-identified patent and that said Letters Patent is hereby corrected as shown below:

In the Specification

Column 1, line 11 please replace "which is are hereby" with --which are hereby--

In the Claims

Column 17, line 29 please replace "into, a first" with --into a first--

Column 18, line 2 please replace "a low, pass filter" with --a low pass filter--

Column 18, lines 3-4 please replace "the frequency, synthesizer" with --the frequency synthesizer--

Column 18, line 26 please replace "the training, tone tracking" with --the training tone tracking--

Signed and Sealed this
Twenty-fourth Day of June, 2014

Michelle K. Lee
*Deputy Director of the United States Patent and Trademark Office*